July 30, 1968

HARUO TESHI ET AL 3,394,642

ELECTRICAL CIRCUIT FOR AUTOMATICALLY CONTROLLING AN
APERTURE DEVICE FOR A PHOTOGRAPHIC CAMERA
Filed June 1, 1965

HARUO TESHI AND
TAKASHI FUJII
INVENTORS

By Wenderoth, Lind and Ponack
Attorneys

United States Patent Office 3,394,642
Patented July 30, 1968

3,394,642
ELECTRICAL CIRCUIT FOR AUTOMATICALLY CONTROLLING AN APERTURE DEVICE FOR A PHOTOGRAPHIC CAMERA
Haruo Teshi and Takashi Fujii, Nagoya, Japan, assignor to Elmo Company Limited, Nagoya, Japan
Filed June 1, 1965, Ser. No. 460,289
6 Claims. (Cl. 95—10)

ABSTRACT OF THE DISCLOSURE

An electrical circuit for automatically controlling an aperture device for use with a photographic camera. A Wheatstone bridge network including a series arrangement of a galvanometer for driving the aperture device and a photoconductor element and a first fixed resistor element for converting variation, in the form of an arithmetic progression, in flow of current through the galvanometer in one pair of adjacent arms. There is provided a second and third fixed resistor element in the other pair of adjacent arms, a source of direct current connected between the junction of one arm of said one arm pair and the adjacent arm of said other arm pair and the junction of the other arm of said one arm pair and the other arm of said other arm pair. There is also a semiconductor diode element connected between the junction of the two arms of said one arm pair and the junction of the two arms of said other arm pair to permit a current to flow between the two last-mentioned junctions through said semiconductor diode only when a change in internal resistance of said photoconductor element due to light falling upon the photoconductor element causes said Wheatstone bridge network to change from its balanced state to a predetermined one of its two unbalanced states.

This invention relates generally to an automatic aperture device for use with a still, or cinematographic, camera or the like and more particularly to an electrical circuit for controlling such an automatic aperture device.

There is already known an automatic aperture device of the type comprising an electrical circuit including a battery, a photoconductor element such as cadmium sulfide, a galvanometer for driving an aperture device and a fixed resistor connected in series circuit relationship, the fixed resistor having a magnitude of resistance which will convert a variation, in the form of a geometrical progression, in brightness of an object to be photographed or a variation in internal resistance of the photoconductor element upon exposing the latter to the object, into a change, in the form of an arithmetic progression, in flow of current through the galvanometer thereby to automatically control the aperture device through the galvanometer.

However, because the photoconductor element has a relatively high resistance for a low brightness of an object to be photographed, such an electrical circuit causes only a small change in flow of current through the galvanometer due to a variation in brightness as compared with the flow caused by a moderate brightness of an object. Also even for a high brightness of an object to be photographed, a change in such a flow of current is less compared with the moderate range of brightness for the reason that the ratio of the photoconductor's resistance to the fixed resistance and therefore the rate of change in resultant resistance of the photoconductor and fixed resistor with respect to a variation, in the form of a geometrical progression, in brightness of the object. Therefore, the characteristic curve of the electrical circuit, plotting brightness (on the abscissa) on a logarithmic scale vs. magnitude of flow of current (on the ordinate) on a linear scale is curved into an S-shape. In other words, the rectilinearity obtained over the moderate range of brightness disappears in the lower and higher ranges of brightnesses resulting in an erroneous automatic aperture device operation.

The principal object of the invention is, accordingly, to provide an improved electrical circuit for automatically controlling an aperture device for use with a photographic camera, which circuit has a brightness vs. current characteristic having a linear portion over a wide range of brightnesses including a lower, a moderate and a higher range of brightnesses.

With this object in view, the invention resides in an electrical circuit for automatically controlling an aperture device for use with a photographic camera, comprising a Wheatstone bridge network including a series arrangement of a galvanometer for driving the aperture device and a photoconductor element and a first fixed resistor element for converting a variation, in the form of a geometrical progression, in resistance of the photoconductor element exposed to an object to be photographed into a variation, in the form of an arithmetic progression, in flow of current through the galvanometer in one pair of adjacent arms, and a second and a third fixed resistor element in the other pair of adjacent arms, a source of direct current connected between the junction of one arm of the one arm pair and the adjacent arm of the other arm pair and the junction of the other arm of the one arm pair and the other arm of the other arm pair, and a semiconductor diode element and a low value resistor serially connected between the junction of the two arms of the one arm pair and the junction of the two arms of the other arm pair to permit a current to flow between the two last-mentioned junctions through the semiconductor diode only when a change in internal resistance of photoconductor element due to light falling upon the photoconductor element causes the Wheatstone bridge network to change from its balanced state to a predetermined one of two unbalanced states whereby the portion of the brightness vs. current characteristic curve over a predetermined one of the higher and lower ranges of brightnesses is linearly continuous to that over the moderate range of brightnesses with substantially the same slope as the latter portion of the curve.

The invention will become more readily apparent from the following detailed description in conjunction with the accompanying drawing in which.

Figure 1:
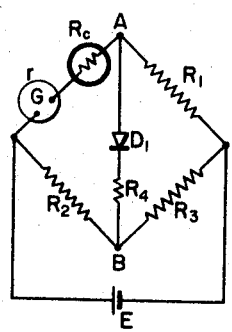
FIGS. 1 and 2 are circuit diagrams illustrating the principle of the invention.

Referring now to FIG. 1 there is illustrated a Wheatstone bridge network including a series arrangement of a moving coil of a galvanometer $r$ and a body $R_c$ of photoconductor material such as cadmium sulfide and a first fixed resistor $R_1$ in a pair of adjacent arms, and a second and a third fixed resistor $R_2$ and $R_3$ in the other pair of adjacent arms. The Wheatstone bridge network has one diagonal AB including a semiconductor diode $D_1$ which may be preferably made of semiconductive silicon and a fourth fixed resistor $R_4$ having a relatively small value of resistance, and the other diagonal having connected thereacross a source of direct current illustrated as a battery E. The battery E has a positive terminal connected to the junction of the moving coil and the second resistor and a negative terminal connected to the junction of the first and third resistors. It is noted that the semiconductor diode $D_1$ is so poled that a current may flow from point A to point B through the same and the resistor $R_4$. It will be understood that the photoconductor element $R_c$ is arranged to be exposed to an object to be photographed and that the galvanometer $r$ serves to drive an aperture device disposed in a photographic camera.

The type of Wheatstone bridge network shown in FIG. 1 but including no diode $D_1$ and resistor $R_4$ can be used to automatically control an aperture device for a photographic camera. As well known, such conventional type of Wheatstone bridge network can have such characteristics that, over the moderate range of brightnesses of an object to be photographed, a flow of current through the galvanometer is substantially linearly proportional to a logarithmic function of the amount of light falling upon the associated photoconductor. As previously described, however, an increment of current flowing through the galvanometer over the higher range of brightnesses decreases as compared with the moderate range of brightnesses and the brightness vs. current curve will be curved downwardly while an increment of current flowing through the galvanometer over the lower range of brightnesses is also less than that over the moderate ranges of brightnesses and the curve will be curved upwardly resulting in an S-shaped characteristic curve such as shown by the solid line in FIG. 5.

The invention seeks to extend the linear portion of the brightness vs. current curve as compared with the conventional type of Wheatstone bridge networks for use in automatically controlling aperture devices for photographic objectives. To this end, the semiconductor diode $D_1$ and the fixed resistor $R_4$ as previously described are disposed on one of the diagonals AB of the Wheatstone bridge network with the diode $D_1$ so poled that a current is allowed to flow from the point A to the point B therethrough.

Now assuming that the reference characters $r$, $R_c$, $R_1$, $R_2$, $R_3$ and $R_4$ denoted in FIG. 1 represent also the magnitudes of resistance of the corresponding components, it will be readily understood that, if $(r+R_c)R_3=R_1R_2$ then the bridge network is in its balanced state in which the potential at point A is equal to that at point B with the result that the diode $D_1$ has no flow of current therethrough.

Also if $(r+R_c)R_3>R_1R_2$ then the Wheatstone bridge is in one unbalanced state where the potential at the point B is higher than that at the point A resulting in a tendency for current to flow from the point B to the point A through the diode $D_1$ and the resistor $R_4$. In this case, the diode is reversely biased and has a very high reverse resistance. Therefore, the current is substantially prevented from flowing from the point B to the point A through the diode $D_1$ and the resistor $R_4$.

On the contrary, if $(r+R_c)R_3<R_1R_2$ then the Wheatstone bridge is in the other unbalanced state where the point A is higher in potential than the point B whereupon a current will flow from the point A to the point B through the diode $D_1$ now having a very low forward resistance and the resistor $R_4$.

In other words, if the internal resistance of the photoconductor $R_c$ decreases below its magnitude at which the Wheatstone bridge is balanced, a current is allowed to flow from the point A to the point B through the diode $D_1$ and the resistor $R_4$. The lower the resistance $R_c$ the higher the potential difference between the points A and B and hence the flow of current from the point A to the point B through the diode $D_1$ and the resistor $R_4$. Since the current flowing through the diagonal AB must pass through the galvanometer $r$ and the photoconductor element $R_c$, a flow of current through the galvanometer correspondingly increases as compared with a circuit which has no diode $D_1$ and no resistor $R_4$ on the diagonal AB.

Figure 5:
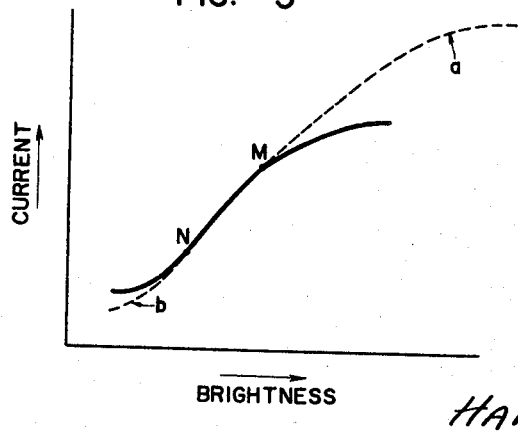
FIG. 5 is a graph illustrating a comparison of the present device with the prior art type device in terms of operable range.

At a point M on the brightness vs. current characteristic curve shown as a solid line in FIG. 5 where the curve begins to be curved into an upwardly convex shape as viewed in FIG. 5 the Wheatstone bridge network can be set to be in its balanced state by having the parameters of the circuit elements in the relationship $$(r+R_c)R_3=R_1R_2$$

Further the magnitude of the resistance $R_4$ can be properly selected. Under these circumstances, it will be appreciated from the foregoing that over the higher range of brightnesses the Wheatstone bridge network shown in FIG. 1 has a substantially linear portion of the brightness vs. current characteristic curve merged into and continuous to the curve portion over the moderate range of brightnesses with substantially the same slope as the latter curve portion as shown by the dotted line $a$ in FIG. 5. In other words, the rectilinearity of the curve extends up to the higher range of brightnesses.

A curve portion in the lower range of brightnesses can be compensated in a similar manner to that above described in conjunction with FIG. 1.

Figure 2:
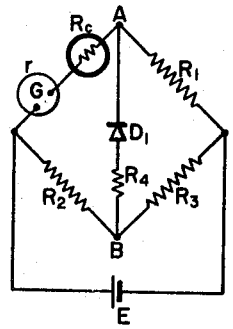

The arrangement shown in FIG. 2 is substantially the same as that illustrated in FIG. 1 except for a diode poled oppositely from that shown in FIG. 1. Therefore, the same reference characters have been employed to identify the corresponding components other than the diode designated by the reference character $D_2$. The arrangement illustrated is designed and constructed such that a current can flow from a point B to point A through the diode $D_2$ and a resistor $R_4$ only when the relationship $$(r+R_c)R_3>R_1R_2$$

holds true. Then it will be appreciated that a current flowing through the galvanometer $r$ and the photoconductor $R_c$ and the current flowing through the diagonal BA flows through the resistor $R_1$ resulting in an increase in voltage drop across the latter. This causes a decrease in current flowing through the resistances $r$ and $R_c$. At a point N on the curve shown by the solid line in FIG. 5 where the curve begins to be curved into an upwardly concave shape, the resistances $R_2$ and $R_3$ can be selected to bear the relationship $$(r+R_c)R_3=R_1R_2$$

with the resistance $R_4$ properly chosen. Under these circumstances, it will be similarly appreciated that over the lower range of brightnesses the Wheatstone bridge network shown in FIG. 2 has a substantially linear portion of the brightness vs. current characteristic curve merged into and consecutive to the curve portion corresponding the moderate range of brightnesses with substantially the same slope as the latter curve portion as shown by the dotted line $b$ in FIG. 5. That is, the rectilinearity of the curve extends to the lower range of brightnesses.

Figure 3:
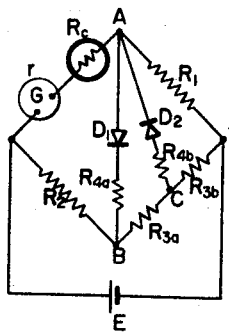
FIGS. 3 and 4 are circuit diagrams illustrating embodiments of the invention.
Figure 4:
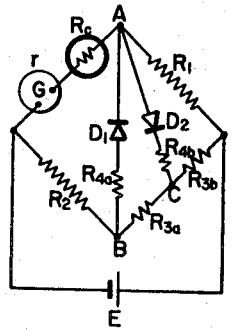

In order to extend both curved portions corresponding to the higher and lower ranges of brightnesses as substantially linear extensions of the curve portion corresponding to the moderate range of brightnesses, the arrangement illustrated in FIG. 1 can be combined with that illustrated in FIG. 2 in a manner as shown in FIG. 3 or 4.

In FIG. 3, the third fixed resistor $R_a$ illustrated in FIG. 1 or 2 is divided into two portions $R_{3a}$ and $R_{3b}$ and the junction C of the two portions $R_{3a}$ and $R_{3b}$ is connected to a vertex A of the bridge network through a resistor $R_{4b}$ similar to the resistor $R_4$ shown in FIG. 2 and a semiconductive diode $D_2$ poled reversely from a semiconductive diode $D_1$ connected between the vertices A and B. Other parts are the same as in the arrangement illustrated in FIG. 1. Thus it will be seen that the arrangement includes a pair of Wheatstone bridges one of which has one diagonal AB having disposed thereon the diode $D_1$ and the resistor $R_{4a}$ and the other of which has one diagonal AC having disposed thereon the diode $D_2$ and the resistor $R_{4b}$. The bridge network having one diagonal AB is designed and constructed such that a current flows from point A to point B through the diode $D_1$ only when $$(r+R_c)(R_{3a}+R_{3b})$$

is less than $R_1R_2$. Then a flow of current through the galvanometer and the photoconductor increases in amount by a magnitude proportional to the magnitude of the current through the diagonal AB. At that time the bridge network having one diagonal AC is, of course, in the relationship $$(r+R_c)R_{3b}<R_1(R_2+R_{3a})$$

and has no flow of current through the diagonal AC because of the high reverse resistance of the diode $D_2$. Thus the diagonal AC has a negligible effect upon the bridge network having the diagonal AB.

When the bridge network having one diagonal AC comprises circuit elements whose parameters bear the relationship $$(r+R_c)R_{3b}>R_1(R_2+R_{3a})$$

a current flows from point C to point A through the diode $D_2$ having low forward resistance and the resistor $R_{4b}$ to decrease a flow of current through the galvanometer and the photoconductor $r$ and $R_c$ by a magnitude proportional to the magnitude of the current flowing through the diagonal CA. At that time, the relationship $$(r+R_c)(R_{3a}+R_{3b})>R_1R_2$$

is present in the bridge network having one diagonal AB. Therefore, the current tending to flow through the diagonal AB is very low due to the diode $D_1$ having a very high reverse resistance with the result that the flow of current through the diagonal AB has a negligible effect upon the bridge network having the diagonal AC.

If the relationship $$(r+R_c)(R_{3a}+R_{3b})\geqq R_1R_2$$

and $$(r+R_c)R_{3b}\leqq R_1(R_2+R_{3a})$$

are simultaneously present, only negligible currents flow through the diagonals AB and AC. Under these circumstances, any increase in the amount of light falling upon the photoconductor may cause a decrease in resistance of the photoconductor until the relationship $$(r+R_c)(R_{3a}+R_{3b})<R_1R_2$$

exists. In this case, the portion of the brightness vs. current characteristic curve over the higher range of brightnesses is composed of a substantially linear extension of the curve portion over the moderate range of brightnesses and having the same slope as the latter curve portion as will be readily understood from the foregoing description given in conjunction with FIG. 1. Similarly when the relationship $$(r+R_c)R_{3b}>R_1(R_2+R_{3a})$$

exists over the lower range of the brightnesses, the corresponding portion of the curve is substantially linear and consecutive to the curve portion over the moderate range of brightnesses with the same slope as the latter curve portion as will be similarly understood from the foregoing description made in conjunction with FIG. 2.

The same result can be produced by an arrangement illustrated in FIG. 4 wherein semiconductor diodes $D_1$ and $D_2$ and a battery E are poled reversely from those shown in FIG. 3. In FIG. 4 it is to be noted that the parameters of circuit elements are selected so as to bear the relationship $$(r+R_c)(R_{3a}+R_{3b})<R_1R_2$$

over the higher range of brightnesses while bearing the relationship $$(r+R_c)R_{3b}>R_1(R_2+R_{2a})$$

over the lower range of brightnesses.

From the foregoing it will be appreciated that the electrical circuit of the invention has the brightness vs. current characteristics linear over a wide range of brightnesses; i.e. they are linear not only over the moderate range of brightnesses but also over the higher and lower ranges of brightnesses. Therefore, controlling of an operative device for a photographic objective by means of the sensitivity of photosensitive material and an exposure time involved is not limited to only a narrow range of brightnesses by using a filter or filters and manually controlling an associated iris diaphragm device but can be carried out over a wide range of brightnesses by using electric resistors. This provides a wide choice in selecting a position within a camera where the aperture changing device controlled by the sensitivity of photosensitive material, exposure time and like can be located and at the same time results in the simplified construction. In addition, the excellent results can be obtained for any sensitivity of photosensitive material and any exposure time involved. Also, the use of a filter and/or an iris diaphragm device gives good results as compared with the prior art type of electrical circuits.

What we claim is:

1. An electrical circuit for automatically controlling an aperture device for use with a photographic camera, comprising a Wheatstone bridge network including a series arrangement of a galvanometer for driving the aperture device and a photoconductor element and a first fixed resistor element for converting a variation, in the form of a geometrical progression, in resistance of said photoconductor element exposed to an object to be photographed into a variation, in the form of an arithmetic progression, in flow of current through the galvanometer in one pair of adjacent arms, and a second and third fixed resistor element in the other pair of adjacent arms, a source of direct current connected between the junction of one arm of said one arm pair and the adjacent arm of said other arm pair and the junction of the other arm of said one arm pair and the other arm of siad other arm pair, and a semiconductor diode element connected between the junction of the two arms of said one arm pair and the junction of the two arms of said other arm pair to permit a current to flow between the two last-mentioned junctions through said semiconductor diode only when a change in internal resistance of said photoconductor element due to light falling upon the photoconductor element causes said Wheatstone bridge network to change from its balanced state to a predetermined one of its two unbalanced states.

2. An electrical circuit for automatically controlling an aperture device for use with a photographic camera, comprising a Wheatstone bridge network including a series arrangement of a galvanometer for driving the aperture device and a photoconductor element and a first resistor element for converting a variation, in the form of a geometrical progression, in resistance of said photoconductor element exposed to an object to be photographed into a variation, in the form of an arithmetic progression in flow of current through the galvanometer in one pair of adjacent arms, and a second and third fixed resistor element in the other pair of adjacent arms, a source of direct current connected between the junction of one arm of said one arm pair and the adjacent arm of said other arm pair and the junction of the other arm of said one arm pair and the other arm of said other arm pair, and a semiconductor diode element connected between the junction of the two arms of said one arm pair and the junction of the two arms of said other arm pair, said semiconductor diode being so poled that only when a decrease in internal resistance of said photoconductor element due to light falling upon the photoconductor element causes said Wheatstone bridge network to change from its balanced state to its unbalanced state, a current flows from the junction of two arms of said one arm pair to the junction of two arms of said other arm pair through said semiconductor element whereby the portion of the brightness vs. current characteristic curve over the higher range of brightnesses is linearly consecutive to that over the moderate range of brightnesses with the substantially same slope as the latter characteristic portion.

3. An electrical circuit as claimed in claim 2, wherein said Wheatstone bridge network is put in its balanced state when said photoconductor element has falling upon the same an amount of light corresponding to the upper limit of the brightness vs. current characteristic curve over the moderate range of the brightnesses.

4. An electrical circuit for automatically controlling an aperture device for use with a protographic camera comprising a Wheatstone bridge network including a series arrangement of a galvanometer for driving the aperture device and a photoconductor element and a first fixed resistor element for converting a variation, in the form of a geometrical progression, in resistance of said photoconductor element exposed to an object to be photographed into a variation, in the form of an arithmetic progression, in flow of current through the galvanometer in one pair of adjacent arms, and a second and a third fixed resistor element in the other pair of adjacent arms, a source of direct current connected between the junction of one arm of said one arm pair and the adjacent arm of said other arm pair and the junction of the other arm of said one arm pair and the other arm of said other arm pair, and a semiconductor diode element connected between the junction of the two arms of said one arm pair and the junction of the two arms of said other arm pair, said semiconductor diode being so poled that only when an increase in internal resistance of said photoconductor element due to light falling upon the photoconductor element causes said Wheatstone bridge network to change from its balanced state to its unbalanced state, a current flows from the junction of two arms of said other arm pair to the junction of two arms of said one arm pair through said semiconductor element whereby the portion of the brightness vs. current characteristic curve over the lower range of brightnesses is linearly consecutive to the characteristic portion over the moderate range of brightnesses with the substantially same slope as the latter characteristic portion.

5. An electrical circuit as claimed in claim 4, wherein said Wheatstone bridge network is put in its balanced state when said photoconductor element has falling upon the same an amount of light corresponding to the lower limit of the brightness vs. current characteristic curve over the moderate range of brightnesses.

6. An electrical circuit for automatically controlling an aperture device for use with a photographic camera, comprising a Wheatstone bridge network including a series arrangement of a galvanometer for driving the aperture device and a photoconductor element and a first fixed resistor element for converting a variation, in the form of a geometrical progression, in resistance of said photoconductor element exposed to an object to be photographed into a variation, in the form of an arithmetic progression, in flow of current through the galvanometer in one pair of adjacent arms, and a second and a third fixed resistor element in the other pair of adjacent arms, a source of direct current connected between the junction of one arm of said one arm pair and the adjacent arm of said other arm pair and the junction of the other arm of said one arm pair and the other arm of said other arm pair, a first semiconductor diode element connected between the junction of the two arms of said one arm pair and the junction of the two arms of said other arm pair to permit a current to flow between the two last-mentioned junctions through said semiconductor diode only when a change in internal resistance of said photoconductor element due to light falling upon the photoconductor element causes said first Wheatstone bridge network to change from its balanced state to a predetermined one of its two unbalanced states, and a second semiconductor diode connected between the junction of two arms of said one arm pair and an intermediate point on said third fixed resistor whereby another Wheatstone bridge network is formed, said second semiconductor diode being poled reversely from said first semiconductor diode such that only when a change in internal resistance of said photoconductor element due to light falling upon the photoconductor element causes said another Wheatstone bridge network to change from its balanced state to the other of its unbalanced states, a current flows from between the associated junctions through said second diode whereby both portions of the brightness vs. current characteristic curve over the higher and lower ranges of brightnesses are linearly consecutive to the characteristic portion over the moderate range of brightnesses with the substantially same slope as the latter characteristic portion.

References Cited

UNITED STATES PATENTS

| 2,974,279 | 3/1961 | Barry et al. | 324—62 |
| 3,180,241 | 4/1965 | Mikusch et al. | 95—64 |
| 3,227,056 | 1/1966 | Lieser | 95—64 XR |
| 3,291,022 | 12/1966 | Brown | 95—64 |

FOREIGN PATENTS 54,512  10/1949  France.

NORTON ANSHER, *Primary Examiner.*

J. F. PETERS, JR., *Assistant Examiner.*